United States Patent
Kherbouchi et al.

(10) Patent No.: US 11,632,037 B2
(45) Date of Patent: Apr. 18, 2023

(54) PROTECTIVE DEVICE FOR A POWER CONVERTER, POWER CONVERSION DEVICE

(71) Applicant: THALES, Courbevoie (FR)

(72) Inventors: Hocine Kherbouchi, Chatou (FR); Eric Ravindranath Dubois, Chatou (FR); Stéphane Guguen, Chatou (FR); Bruno Sadeg, Chatou (FR)

(73) Assignee: THALES, Courbevoie (FR)

( * ) Notice: Subject to any disclaimer, the term of this patent is extended or adjusted under 35 U.S.C. 154(b) by 56 days.

(21) Appl. No.: 17/386,588

(22) Filed: Jul. 28, 2021

(65) Prior Publication Data

US 2022/0037990 A1 Feb. 3, 2022

(30) Foreign Application Priority Data

Jul. 29, 2020 (FR) ...................................... 2008023

(51) Int. Cl.
*H02M 1/32* (2007.01)
*H02M 1/00* (2006.01)
*H02M 5/293* (2006.01)

(52) U.S. Cl.
CPC ........... *H02M 1/32* (2013.01); *H02M 1/0009* (2021.05); *H02M 5/293* (2013.01)

(58) Field of Classification Search
CPC ....... H02M 1/32; H02M 1/0009; H02M 5/293
See application file for complete search history.

(56) References Cited

U.S. PATENT DOCUMENTS

| 6,351,359 | B1 | 2/2002 | Jaeger |
| 2016/0020684 | A1 | 1/2016 | Imai et al. |
| 2017/0338733 | A1 | 11/2017 | Kashihara et al. |
| 2019/0393822 | A1* | 12/2019 | Ganesan ................. H02P 31/00 |
| 2021/0036632 | A1* | 2/2021 | Hayashi ................ H02M 3/158 |
| 2021/0313924 | A1* | 10/2021 | Yoo ........................ H02M 7/797 |

* cited by examiner

*Primary Examiner* — Rafael O De Leon Domenech
(74) *Attorney, Agent, or Firm* — BakerHostetler

(57) ABSTRACT

A protective device intended to protect a power converter, the protective device includes a set of at least one sensor, each sensor in the set of at least one sensor making it possible to deliver a measurement representative of the instantaneous current delivered at the output of a power converter on a phase in the set of at least one phase, a protective device receiving the measurement representative of the instantaneous current delivered by the set of at least one sensor and connected to a control device and to the power converter such that the commands delivered by the control device are transmitted to the power converter via the protective device, the protective device being configured to inhibit the commands delivered by the control device when the absolute value of the measurement representative of the instantaneous current and delivered by at least one sensor in the set of at least one sensor exceeds a predetermined first threshold S1 such that the power switches of the power converter are kept in the off state.

5 Claims, 1 Drawing Sheet

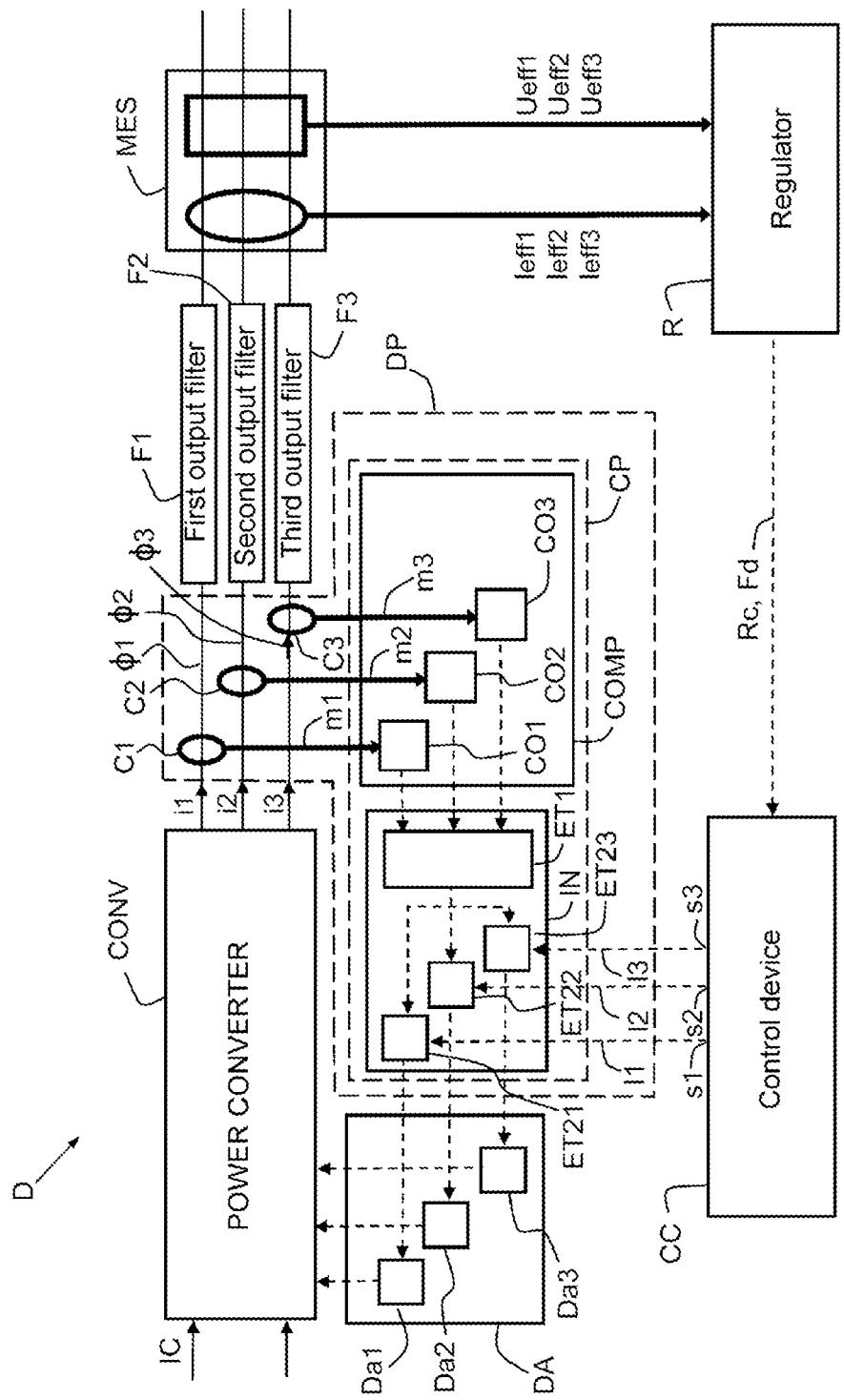

PROTECTIVE DEVICE FOR A POWER CONVERTER, POWER CONVERSION DEVICE

CROSS-REFERENCE TO RELATED APPLICATIONS

This application claims priority to foreign French patent application No. FR 2008023, filed on Jul. 29, 2020, the disclosure of which is incorporated by reference in its entirety.

FIELD OF THE INVENTION

The invention relates to the field of power electronics and, more particularly, to the field of protecting a power converter configured to deliver an AC current, for example, a power inverter, in the event of a short-circuit causing an increase in the current flowing through the power switches of the power converter.

BACKGROUND

The invention is notably applicable to protecting power converters used in aeronautics to deliver an AC voltage intended to supply an on-board network of an aircraft.

The current delivered by a power inverter is conventionally regulated by a control loop in which the RMS current flowing at the output of an output filter of the inverter is measured and compared to a predetermined threshold value. When the RMS current flowing at the output of the output filter of the inverter exceeds the threshold value, the output current is regulated by changing the duty cycle of the power switches so that it returns to a value which is less than or equal to the threshold value.

However, the reaction time of such a solution is relatively substantial, this not preventing the RMS output current from increasing to reach a relatively high trip threshold which causes a circuit breaker to be tripped, making the inverter unavailable. This solution does not prevent large variations in current either. This solution thus has the drawback of making it necessary to size the power switches and the power components of the output filter of the switch so that they can tolerate a high maximum current and large variations in current, making these components relatively bulky and heavy.

SUMMARY OF THE INVENTION

The aim of the invention is to limit at least one of the above-mentioned drawbacks.

To this end, the subject of the invention is a protective device intended to protect a power converter comprising power switches and intended to deliver a set of at least one AC phase, the power converter belonging to a power conversion device comprising a control device intended to generate commands intended to switch the power switches between an off state and an on state, the protective device comprising:

a set of at least one sensor, each sensor in the set of at least one sensor making it possible to deliver a measurement representative of the instantaneous current delivered at the output of the power converter on a phase in the set of at least one AC phase, a protective device receiving the measurement representative of the instantaneous current delivered by the set of at least one sensor and intended to be connected to the control device and to the power converter such that the commands delivered by the control device are transmitted to the power converter via the protective device, the protective device being configured to inhibit the commands delivered by the control device when the absolute value of the measurement representative of the instantaneous current and delivered by at least one sensor in the set of at least one sensor exceeds a predetermined first threshold S1 such that the power switches of the power converter are kept in the off state.

Advantageously, the protective device comprises:

a set of at least one comparator, each comparator being configured to compare the absolute value of the measurement representative of the instantaneous current and delivered by each sensor in the set of at least one sensor to a first threshold, an inhibitor connected to the output of each comparator in the set of at least one comparator and being intended to be connected to the control device and to the power converter such that the commands delivered by the control device are transmitted to the power converter via the inhibitor, the inhibitor being configured to inhibit the commands delivered by the control device when the absolute value of the measurement representative of the instantaneous current and delivered by at least one sensor in the set of at least one sensor is greater than the first threshold.

Advantageously, the protective device is configured to inhibit the commands generated by the control device as long as the absolute value of the measurement representative of one of the instantaneous currents is greater than a second threshold which is less than the first threshold.

Advantageously, the set of at least one sensor comprises a Hall-effect sensor.

The invention also relates to a power conversion device comprising a protective device according to the invention. The conversion device also comprises the power converter and the control device. The protective device is connected to the control device and to the power converter such that the commands generated by the control device are transmitted to the power converter via the protective device.

Advantageously, the power conversion device comprises a regulator configured to determine a duty cycle for a chopping frequency and a target current, the control device being configured to generate the commands intended to switch the power switches at the chopping frequency with the duty cycle, the regulator receiving the measurement delivered by each sensor in the set of at least one sensor:

set the value of the target current at a predetermined reference current, when the absolute value of the measurement representative of the instantaneous output current and delivered by each sensor in the set of at least one sensor is less than or equal to a third threshold which is less than the first threshold and than the second threshold, and on the basis of a value of the target current equal to a protective current which is less than the reference current, when the absolute value of the measurement representative of the instantaneous output current and delivered by at least one sensor in the set of at least one sensor is greater than the third threshold, and/or set the chopping frequency equal to a predetermined reference chopping frequency, when the absolute value of the measurement representative of the instantaneous output current and delivered by each sensor in the set of at least one sensor is less than or equal to a third threshold which is less than the first threshold and than the second threshold, and the chopping frequency at a protective chopping frequency, when the absolute value of the measurement representative of the instantaneous output current and delivered by at least one sensor in the set of at least one sensor is greater than the third threshold.

Advantageously, the power conversion device comprises a filtering assembly comprising an output filter associated with each phase in the set of at least one AC phase, each sensor in the set of at least one sensor being intended to measure a quantity representative of the instantaneous current between power switches of the power converter and an output filter of the filtering assembly.

BRIEF DESCRIPTION OF THE DRAWINGS

Other features, details and advantages of the invention will become apparent upon reading the description, which is given with reference to the appended drawing, which is given by way of example and which shows:

FIG. 1 schematically shows a power conversion device D comprising a power converter and a protective device DP according to the invention.

DETAILED DESCRIPTION

The power conversion device D comprises a power converter CONV able to deliver a single-phase or polyphase, for example three-phase, AC voltage. This converter CONV is, for example, an inverter (DC/AC converter) or an AC/AC converter.

Conventionally, the converter CONV comprises power switches.

The power switches are typically electronic switches formed by power transistors, for example insulated gate bipolar transistors or IGBTs. Other types of power switches may of course be used, for example, MOSFET, COOLMOS, JFET transistors or thyristors, for example based on gallium nitride (GaN) or on silicon carbide (SiC).

In the non-limiting example of FIG. 1, the converter CONV is a three-phase inverter delivering three phases ϕ1, ϕ2, ϕ3 intended to supply a user network, for example an on-board network of an aircraft, through a filtering assembly comprising one output filter F1, F2, F3 per phase ϕ1, ϕ2, ϕ3. Each output filter is intended to filter the signal travelling on one of the phases ϕ1, ϕ2, ϕ3.

Each output filter F1, F2, F3 is a low-pass filter. It has a high cut-off frequency with respect to the chopping frequency of the power converter CONV such that the output filter cuts off the high-frequency component of the output signal of the converter CONV while retaining its variable component without influencing its average value such that the user network is supplied by a three-phase AC voltage with an average value of zero or by a three-phase AC current with an average value of zero according to whether the inverter is controlled so as to be a current or a voltage inverter.

In other words, each output filter F1, F2 or F3 is configured such that each phase is sinusoidal at the output of the output filter F1, F2 or F3.

Each output filter F1, F2 or F3 is, for example, an RLC filter.

The power conversion device D comprises a regulator R configured to determine a duty cycle Rc, at a predetermined chopping frequency Fd, on the basis of a target current Ic and of measurements of the RMS current Ieff1, Ieff2, Ieff3 and/or of the RMS voltage Ueff1, Ueff2, Ueff3 at the output of the output filters F1, F2, F3 and delivered by a current-measuring and/or voltage-measuring device MES.

The regulator R is configured to determine the duty cycle Rc such that each of the RMS currents Ieff1, Ieff2, Ieff3 is equal or substantially equal to the target current Ic at the chopping frequency Fd.

The power conversion device D comprises a control device CC intended to control the switching of the power switches of the converter CONV via an driver device DA so as to modulate the current, for example the DC current, injected at the input of the converter CONV in order to produce the three AC phases of a three-phase voltage or of a three-phase current, at the output of the output filters F1, F2, F3, each having an RMS current equal or substantially equal to the target current Ic or an RMS voltage Ueff equal or substantially equal to the target voltage Uc.

Pulse-width modulation (PWM) is typically used.

The control device CC delivers commands intended to switch the switches of the converter CONV at the chopping frequency Fd with the duty cycle Rc.

These commands are, for example, switching pulses I1, I2, I3 delivered at the chopping frequency Fd with a duty cycle Rc defined by the regulator R.

The switching pulses I1, I2, I3 are, for example, applied to the power switches of the power converter CONV via a driver device DA so as to control successive switching of each of the switches between the on state and the off state at the chopping frequency Fd with the duty cycle Rc.

According to the invention, the power conversion device D comprises a particular protective device DP surrounded by dotted lines in FIG. 1.

The protective device DP according to the invention comprises: a set of at least one sensor comprising, here, sensors C1, C2 or C3, respectively, each making it possible to deliver a measurement m1, m2 or m3, respectively, representative of the instantaneous current flowing at the output of the power converter CONV on one of the phases ϕ1, ϕ2 or ϕ3, respectively, between power switches of the converter CONV and the output filter F1, F2 or F3, respectively, which filters the phase in question ϕ1, ϕ2 or ϕ3, respectively.

a protective device CP intended to receive the measurement representative of the instantaneous current m1, m2 or m3, respectively, and delivered by each sensor C1, C2, C3, and to be connected to the control device CC and to the power converter CONV such that the switching pulses I1, I2, I3, or more generally the commands, delivered by the control device CC are transmitted to the power converter CONV via the protective device CP, the protective device CP being configured to inhibit the switching pulses I1, I2, I3, or, more generally, the commands, when the absolute value of at least one of the measurements out of m1, m2 and m3 exceeds a positive predetermined first threshold S1 such that the switches of the power converter CONV are kept in the off state.

The driver device DA is configured so as to keep the power switches of the power converter CONV in the off state when it does not receive switching, or control, pulses originating from the control device CC, that is to say when the absolute value of at least one of the measurements out of the measurements m1, m2 and m3 exceeds the first threshold S1, and so as to apply the switching, or control, pulses to the power switches of the converter CONV, when the driver device DA receives the switching pulses originating from the control device CC, that is to say when none of the absolute values of the measurements m1, m2 and m3 exceeds the first threshold S1, so as to switch each of the power switches of the converter CONV between its on state and its off state at the chopping frequency Fd with the duty cycle Rc.

This solution has a limited reaction time, makes it possible to prevent too substantial an increase in the current flowing through the power switches following an increase in the RMS current and makes it possible to prevent differences in current which are too substantial, this making it possible to limit the size of the power switches and of the output filter. This solution also makes it possible to protect the converter during a transient or temporary short-circuit. It makes it possible, for example, to react before a control loop based on the regulator which determines, when the measurement of at least one of the RMS output currents Ieff1, Ieff2, Ieff3 exceeds a predetermined short-circuit current value, a particular duty cycle defined to make the absolute value of the RMS current decrease when the control device controls the switches on the basis of this particular duty cycle.

This solution also keeps the short-circuit current at an acceptable level while the circuit breaker of the network trips whatever protects the converter during a permanent short-circuit.

Each of the sensors C1, C2, C3 advantageously comprises a Hall-effect sensor. The measurement at the output of the sensor is an instantaneous voltage which is an image of the instantaneous current or a measurement of the instantaneous current. The first threshold S1 and each threshold mentioned in the remainder of the patent application is therefore a positive voltage or current threshold.

Each sensor may comprise a filter and/or an amplifier which makes it possible to filter and/or amplify the measurement originating from the Hall-effect sensor.

In the non-limiting embodiment in the figures, the protective device CP comprises:

a comparator device COMP configured to compare the absolute value of the measurement m1, m2, m3 representative of the instantaneous output current i1, i2, i3, and delivered by each of the sensors C1, C2, C3, to the first threshold S1, an inhibitor IN connected to the converter CONV and to the control device CC such that the switching pulses or commands delivered by the control device CC are transmitted to the power converter CONV via the inhibitor IN, the inhibitor IN being configured to inhibit, that is to say mask, the switching pulses, or commands, originating from the control device CC, when the absolute value of at least one of the measurements out of m1, m2 and m3 is greater than the first threshold S1, so as to keep the power switches of the power converter CONV in the off state.

The comparator device COMP comprises, for example, three comparators CO1, CO2, CO3. Each comparator CO1, CO2 and CO3, respectively, is configured to compare the absolute value of the measurement m1, m2 and m3, respectively, representative of one of the instantaneous output currents, to the first threshold S1. Each comparator CO1, CO2 and CO3, respectively, is configured to deliver an output signal equal to 0 when the absolute value of the measurement in question m1, m2 and m3, respectively, is greater than the first threshold S1 and equal to 1 when the measurement in question m1, m2 and m3, respectively, is less than or equal to the first threshold S1.

The inhibitor IN comprises, for example, a first logic circuit ET1 with three AND inputs receiving the outputs of the three comparators CO1, CO2, CO3 and which is configured to deliver an output equal to 1 when the three outputs of the comparators are equal to 1 and an output equal to 0 when the output of at least one of the comparators is equal to 0.

Thus the commands or pulses I1, I2, I3 delivered by the control device CC are transmitted to the driver device DA only when the absolute values of each of the measures m1, m2 and m3 is less than or equal to the first threshold S1.

In the non-limiting example in the figures, the control device CC delivers three sets of switching pulses I1, I2, I3. Each set of switching pulses I1, I2, I3 is intended to control a subset of power switches which is intended to generate one of the output phases ϕ1, ϕ2, ϕ3 of the converter CONV. To this end, the control device CC comprises three outputs s1, s2, s3. The control device CC delivers one of the three sets of switching pulses I1, I2, I3 to each of these outputs s1, s2, s3. The inhibitor IN therefore comprises three second AND logic circuits: ET21, ET22, ET23. The first input of each of the second logic circuits ET21, ET22, ET23 receives the output of the first logic circuit ET1. The second input of each of the second logic circuits ET21, ET22, ET23 is connected to one of the outputs s1, s2, s3 of the control device CC so as to receive one of the sets of switching pulses I1, I2, I3.

The output of each of the second logic circuits ET21, ET22 and ET23, respectively, is thus equal to 0 when the absolute value of at least one of the measurements out of m1, m2 and m3 is greater than the first threshold S1. The output of each of the second logic circuits ET21, ET22 and ET23, respectively, is thus equal to the switching pulses I1, I2 and I3, respectively, or more generally to the commands generated by the control device CC and transmitted via said output s1, s2 or s3, respectively, connected to the second logic circuit in question, when the absolute values of the three measurements m1, m2 and m3 are less than or equal to the first threshold S1.

The driver device DA comprises, for example, three individual driver devices Da1, Da2, Da3. Each individual driver device Da1, Da2 and Da3, respectively, is connected to the output of one of the second logic circuits ET21, ET22 and ET23, respectively, so as to transmit the set of switching pulses I1, I2 and I3, respectively, which is received at the input of the individual driver device Da1, Da2 and Da3, respectively, to the power switches of the converter CONV which make it possible to adjust the corresponding phase ϕ1, ϕ2 and ϕ3, respectively.

Advantageously, the protective device DP is configured to keep the power switches of the converter CONV in the off state as long as the absolute value of at least one of the measurements out of m1, m2 and m3 is greater than a second threshold S2 which is less than the first threshold S1.

To this end, each of the comparators CO1, CO2 or CO3, respectively, is, for example, a two-threshold comparator, with a first threshold S1 and a second threshold S2, and is configured so that its output is equal to 0, when the absolute value of the measurement m1, m2 or m3, respectively, is greater than the first threshold S1, and remains equal to 0 as long as the absolute value of the measurement m1, m2 or m3, respectively, which it receives is greater than the second threshold S2. Each of the comparators CO1, CO2 or CO3, respectively, is also configured so that its output is equal to 1, once the measurement m1, m2 or m3, respectively, injected at the input of the comparator becomes less than or equal to the second threshold S2 again and remains equal to 1 as long as the measurement m1, m2 or m3, respectively, is less than or equal to the first threshold S1.

The various thresholds thus ensure the stability of the control and of the power during the short-circuit, the switches remaining in the off state as long as the current is between the first threshold S1 and the second threshold S2.

Advantageously, the regulator R is configured:

to set the chopping frequency Fd at a predetermined reference chopping frequency Fref when the absolute value of each measurement m1, m2 and m3 is less than or equal to a third threshold S3 which is less than the first threshold S1 and than the second threshold S2 and to set the chopping frequency Fd at a protective chopping frequency Fpro when the absolute value of at least one of the measurements out of m1, m2 and m3 is greater than the third threshold S3, and/or to determine the duty cycle Rc on the basis of a value of the target current Ic equal to a predetermined reference current Iref when the absolute value of each of the measurements m1, m2 and m3 is less than or equal to a third threshold S3 which is less than the first threshold S1 and than the second threshold S2, and to set the duty cycle Rc on the basis of a value of the target current Ic equal to a protective current Ipro which is less than the reference current Iref, when the absolute value of at least one of the measurements out of m1, m2 and m3 is greater than the third threshold S3.

Advantageously, the duty cycle is determined on the basis of the set chopping frequency Fd and on the basis of the set duty cycle.

The control device CC uses the duty cycle Rc and the value of the chopping frequency Fd to generate the switching pulses or commands.

Modifying the chopping frequency makes it possible to protect the power switches from wear by limiting the losses dissipated by the power switches, and therefore the heating of these power switches, because of the decrease in the switching frequency of the converters when the third threshold S3, from which a short-circuit is considered to start, is exceeded.

Modifying the target current Ic makes it possible to bring the instantaneous current, which has a tendency to deform in the event of a short-circuit, closer to a sinusoid, this making it possible to eliminate harmonics and therefore to size the power switches to be smaller, this being beneficial for the weight and the volume of these switches.

In addition, the regulator may be configured, though this is not necessary, to compare the measurements of the RMS current to a threshold RMS current and to determine, when the measurement of at least one of the RMS currents exceeds a predetermined short-circuit current, a particular duty cycle, such that the RMS current decreases when the control device controls the switches on the basis of this particular duty cycle.

In the advantageous embodiment in the figures, each sensor is intended to deliver a measurement m1, m2 or m3, respectively, representative of the instantaneous current flowing at the output of the power converter CONV on one of the phases $\phi 1$, $\phi 2$ or $\phi 3$, respectively, between power switches of the converter CONV and the output filter F1, F2 or F3, respectively, which filters the phase in question $\phi 1$, $\phi 2$ or $\phi 3$, respectively. In other words, each sensor measures a quantity representative of the instantaneous current at the input of the associated output filter.

As a variant, each sensor measures a quantity representative of the instantaneous current at the output of the associated output filter or, for example, between an inductor and a capacitor of the output filter when the latter is an LC or RLC filter.

In the example in the figures, the protective device DP is positioned at a distance with respect to the driver device DA and is intended to be interposed between the driver device DA and the control device CC. As a variant, the protective device DP is integrated into the driver device DA.

The invention has been described in the case of an inverter delivering a three-phase AC voltage but it is applicable to any power converter delivering a single-phase or polyphase AC voltage.

A person skilled in the art will be able to adapt the invention in these other cases by modifying notably the number of comparators and the number of driver devices, each of these numbers having to be equal to the number of phases delivered by the power converter.

The control device is, for example, a microcontroller.

Each device out of the regulator, the control device, the driver device and the inhibitor may comprise one or more dedicated electronic circuits or a general-purpose circuit. Each electronic circuit may comprise a reprogrammable computing machine (a processor or a microcontroller, for example) and/or a computer running a program comprising a sequence of instructions and/or a dedicated computing machine (for example a set of logic gates such as an FPGA, a DSP or an ASIC, or any other hardware module).

The invention claimed is:

1. A power conversion device (D) comprising a power converter (CONV) comprising power switches and intended to deliver a set of at least one AC phase, a control device (CC) intended to generate commands intended to switch the power switches between an off state and an on state, the power conversion device (D) comprising:

a set of at least one sensor (C1, C2, C3), each sensor in the set of at least one sensor making it possible to deliver a measurement representative of the instantaneous current delivered at the output of the power converter (CONV) on a phase in the set of at least one AC phase, a protective device (CP) connected to the control device (CC) and to the power converter (CONV) such that the commands generated by the control device (CC) are transmitted to the power converter (DC) via the protective device (CP), the protective device receiving the measurement representative of the instantaneous current delivered by the set of at least one sensor, the protective device (CP) being configured to inhibit the commands delivered by the control device (CC) when the absolute value of the measurement representative of the instantaneous current and delivered by at least one sensor in the set of at least one sensor exceeds a predetermined first threshold S1 such that the power switches of the power converter (CONV) are kept in the off state, the power conversion device comprising a regulator configured to determine a duty cycle for a predetermined chopping frequency and a predetermined target current, the control device being configured to generate the commands intended to switch the power switches at the chopping frequency with the duty cycle, the regulator receiving the measurement delivered by each sensor in the set of at least one sensor and being further configured to:

determine the duty cycle on the basis of a value of the target current at a predetermined reference current, when the absolute value of the measurement representative of the instantaneous output current and delivered by each sensor in the set of at least one sensor is less than or equal to a third threshold S3 which is less than the first threshold S1 and less than a second threshold S2, said second threshold S2 being less than the first threshold S1, and to determine the duty cycle on the basis of a value of the target current which is equal to a protective current which is less than the predetermined reference current, when the absolute value of the measurement representative of the instantaneous output current and delivered by at least one sensor in the set of at least one sensor is greater than the third threshold S3, and/or set the value of the chopping frequency at a predetermined reference chopping frequency, when the absolute value of the measurement representative of the instantaneous output current and delivered by each sensor in the set of at least one sensor is less than or equal to the third threshold S3, and set the chopping frequency at a protective chopping frequency, when the absolute value of the measurement representative of the instantaneous output current and delivered by at least one sensor in the set of at least one sensor is greater than the third threshold S3.

2. The power conversion device according to claim 1, wherein the protective device (CP) comprises:

a set of at least one comparator (CO1, CO2, CO3), each comparator being configured to compare the absolute value of the measurement representative of the instantaneous current and delivered by each sensor (C1, C2, C3) in the set of at least one sensor to the first threshold S1, an inhibitor (IN) connected to the output of each comparator (CO1, CO2, CO3) in the set of at least one comparator and being intended to be connected to the control device (CC) and to the power converter (CONV) such that the commands delivered by the control device (CC) are transmitted to the power converter (CONV) via the inhibitor (IN), the inhibitor (IN) being configured to inhibit the commands delivered by the control device when the absolute value of the measurement representative of the instantaneous current and delivered by at least one sensor in the set of at least one sensor is greater than the first threshold S1.

3. The power conversion device according to claim 1, wherein the protective device (CP) is configured to inhibit the commands generated by the control device as long as the absolute value of the measurement representative of one of the instantaneous currents is greater than the second threshold S2.

4. The power conversion device according to claim 1, wherein the set of at least one sensor comprises a Hall-effect sensor.

5. The power conversion device according to claim 1, wherein the power conversion device comprises a filtering assembly comprising an output filter associated with each phase in the set of at least one AC phase, each sensor in the set of at least one sensor being intended to measure a quantity representative of the instantaneous current between power switches of the power converter and the output filter of the filtering assembly.

* * * * *